United States Patent
Amberg, II

(10) Patent No.: US 8,063,294 B1
(45) Date of Patent: Nov. 22, 2011

(54) MUSICAL INSTRUMENT PRACTICE SYSTEM

(76) Inventor: Stephen W. Amberg, II, Tampa, FL (US)

( * ) Notice: Subject to any disclaimer, the term of this patent is extended or adjusted under 35 U.S.C. 154(b) by 0 days.

(21) Appl. No.: 12/658,647

(22) Filed: Feb. 12, 2010

(51) Int. Cl.
 *G10D 9/00* (2006.01)
(52) U.S. Cl. ............ 84/453; 381/74; 381/118; 381/120; 174/541
(58) Field of Classification Search ............ 84/453; 381/74, 118, 120; 174/541
 See application file for complete search history.

(56) References Cited

U.S. PATENT DOCUMENTS

| | | | | |
|---|---|---|---|---|
| 4,082,409 A * | 4/1978 | Bailey et al. | | 439/638 |
| 4,245,136 A * | 1/1981 | Krauel, Jr. | | 381/56 |
| 4,406,920 A * | 9/1983 | Krauel, Jr. | | 381/80 |
| 4,803,728 A * | 2/1989 | Lueken | | 439/638 |
| 4,829,571 A * | 5/1989 | Kakiuchi et al. | | 381/309 |
| 4,944,016 A * | 7/1990 | Christian | | 381/74 |
| 5,018,204 A * | 5/1991 | Christian | | 381/74 |
| 5,025,704 A * | 6/1991 | Davis | | 84/723 |
| 5,105,711 A * | 4/1992 | Barnard | | 84/744 |
| 5,812,683 A * | 9/1998 | Parker et al. | | 381/74 |
| 6,005,950 A * | 12/1999 | Cuniberti | | 381/61 |
| 6,069,960 A * | 5/2000 | Mizukami et al. | | 381/74 |
| 6,091,812 A * | 7/2000 | Iglehart et al. | | 379/308 |
| 6,600,826 B1 * | 7/2003 | Xavier | | 381/384 |
| 6,626,704 B1 * | 9/2003 | Pikel | | 439/638 |
| 6,640,257 B1 * | 10/2003 | MacFarlane | | 710/1 |
| 6,671,494 B1 * | 12/2003 | James | | 455/66.1 |
| 6,700,981 B1 * | 3/2004 | Howard | | 381/74 |
| 6,724,250 B2 * | 4/2004 | Chuang | | 330/65 |
| 6,873,862 B2 * | 3/2005 | Reshefsky | | 455/569.1 |
| 6,985,592 B1 * | 1/2006 | Ban et al. | | 381/74 |
| 7,187,948 B2 * | 3/2007 | Alden | | 455/557 |
| 7,215,766 B2 * | 5/2007 | Wurtz | | 379/430 |
| 7,220,913 B2 * | 5/2007 | Juszkiewicz et al. | | 84/742 |
| 7,395,090 B2 * | 7/2008 | Alden | | 455/557 |
| 7,627,352 B2 * | 12/2009 | Gauger et al. | | 455/569.1 |
| 7,818,078 B2 * | 10/2010 | Iriarte | | 700/94 |
| 7,836,216 B2 * | 11/2010 | Kashi et al. | | 710/15 |
| 2004/0247142 A1 * | 12/2004 | Sawhney et al. | | 381/120 |
| 2005/0130697 A1 * | 6/2005 | Dyer | | 455/550.1 |
| 2007/0041582 A1 * | 2/2007 | Lam | | 379/908 |
| 2008/0232614 A1 * | 9/2008 | Kamihara et al. | | 381/120 |
| 2009/0323988 A1 * | 12/2009 | Welti | | 381/118 |

OTHER PUBLICATIONS

Rane, Dennis, "Why Not Wye?" © 1991 Rane Corporation.*

* cited by examiner

*Primary Examiner* — Elvin G Enad
*Assistant Examiner* — Robert W Horn

(57) ABSTRACT

A combining housing has first, second and third connectors. A music player has a first line adapted to be coupled to the first connector. A special effects box has a second line adapted to be coupled to the second connector. Earphones have a third line adapted to be coupled to the third connector. A musical instrument has a supplemental line adapted to be coupled to the special effects box. Positive, negative and ground wires are within each of the lines and continue within the combining housing. An electrical assembly includes the positive, negative and ground wires. The positive lines are coupled together within the combining housing forming a first junction. The negative wires are coupled together within the combining housing forming a second junction. The ground wires are coupled together within the housing forming a third junction.

1 Claim, 3 Drawing Sheets

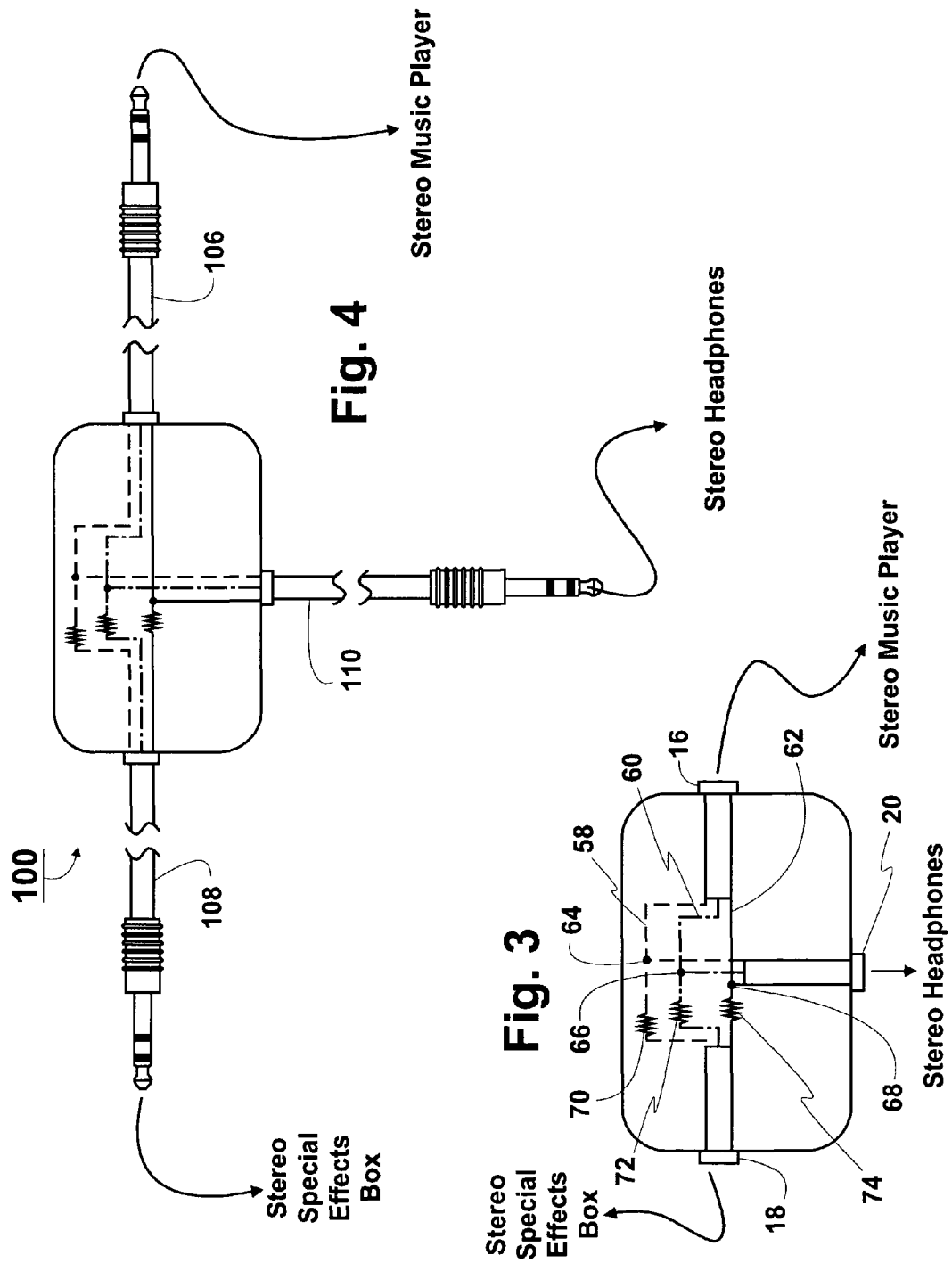

MUSICAL INSTRUMENT PRACTICE SYSTEM

BACKGROUND OF THE INVENTION

1. Field of the Invention

The present invention relates to a musical instrument system and more particularly pertains to allowing a learner to practice a musical instrument while concurrently listening to background music and practicing music while using earphone, the music not being heard by third persons. The practicing and listening is done in a convenient, reliable and economical manner.

2. Description of the Prior Art

The use of musical instrument practice systems of known designs and configurations is known in the prior art. More specifically, musical instrument practice systems of known designs and configurations previously devised and utilized for the purpose of allowing learners to practice a musical instrument are known to consist basically of familiar, expected, and obvious structural configurations, notwithstanding the myriad of designs encompassed by the crowded prior art which has been developed for the fulfillment of countless objectives and requirements.

While the prior art devices fulfill their respective, particular objectives and requirements, they do not describe a musical instrument system that allows a learner to practice a musical instrument while concurrently listening to background music and practicing music while using earphone, the music not being heard by third persons.

In this respect, the musical instrument system according to the present invention substantially departs from the conventional concepts and designs of the prior art, and in doing so provides an apparatus primarily developed for the purpose of allowing a learner to practice a musical instrument while concurrently listening to background music and practicing music while using earphone, the music not being heard by third persons.

Therefore, it can be appreciated that there exists a continuing need for a new and improved musical instrument system which can be used for allowing a learner to practice a musical instrument while concurrently listening to background music and practicing music while using earphone, the music not being heard by third persons. In this regard, the present invention substantially fulfills this need.

SUMMARY OF THE INVENTION

In view of the foregoing disadvantages inherent in the known types of musical instrument practice systems of known designs and configurations now present in the prior art, the present invention provides an improved musical instrument system. As such, the general purpose of the present invention, which will be described subsequently in greater detail, is to provide a new and improved musical instrument system and method which has all the advantages of the prior art and none of the disadvantages.

To attain this, the present invention essentially comprises a combining housing having a plurality of female ports being a first port and a second port each adapted to receive musical input and a third port adapted to generate musical output as a function of the received inputs.

Next provided is a music player. The music player is chosen from the class of music players including an iPod, MP3 player, CD player, cassette player, and record player. A first electrical line is provided. The first electrical line extends from the music player and terminates in a first free end. A first jack is attached to the first free end. The first jack is adapted to be coupled to the first port whereby the music player will generate background music to the combining housing for being heard only by the learner.

Next, a special effects box and a second electrical line are provided. The second electrical line extends from the special effects box and terminates in a second free end. A second jack is attached to the second free end. The second jack is adapted to be coupled to the second port. The special effects box has a supplemental port.

A musical instrument is next provided and a supplemental electrical line are provided. The supplemental electrical line extends from the musical instrument and terminates in a supplemental free end. A supplemental jack is attached to the supplemental free end. The supplemental jack is adapted to be coupled to the supplemental port. In this manner, the musical instrument will generate player music to the combining housing for being, heard only by the learner.

Next, earphones and a third electrical line are provided. The third electrical line extends from the earphones and terminating in a third free end. A third jack is attached to the third free end. The third jack is adapted to be coupled to the third port. In this manner, the learner may use the earphones to listen to a combined output of the music player and the musical instrument for being heard only by the learner.

An electrical assembly is provided within the combining housing. Each of the electrical lines includes a positive wire and a negative wire and a ground wire. The electrical assembly includes the positive wires of each of the lines coupled together and forming a first junction, the negative wires of each of the lines coupled together and forming a second junction, and the ground wires of each of the lines coupled together and forming a third junction. The electrical assembly further includes a first resistor in the positive wire of the first line adjacent to the first junction, a second resistor in the negative wire of the first line adjacent to the second junction, and a third resistor in the ground wire of the first line adjacent to the third junction.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved musical instrument system which has all of the advantages of the prior art musical instrument practice systems of known designs and configurations and none of the disadvantages.

It is another object of the present invention to provide a new and improved musical instrument system which may be easily and efficiently manufactured and marketed.

It is further object of the present invention to provide a new and improved musical instrument system which is of durable and reliable constructions.

An even further object of the present invention is to provide a new and improved musical instrument system which is susceptible of a low cost of manufacture with regard to both materials and labor, and which accordingly is then susceptible of low prices of sale to the consuming public, thereby making such musical instrument system economically available to the buying public.

Even still another object of the present invention is to provide a musical instrument system for allowing a learner to practice a musical instrument while concurrently listening to background music and practicing music while using earphone, the music not being heard by third persons.

Lastly, it is an object of the present invention to provide a new and improved musical instrument practice system having a combining housing with first, second and third connectors. A music player has a first line adapted to be coupled to the first connector. A special effects box has a second line adapted to be coupled to the second connector. Earphones have a third line adapted to be coupled to the third connector. A musical instrument has a supplemental line adapted to be coupled to the special effects box. Positive, negative and ground wires are within each of the lines and continue within the combining housing. An electrical assembly includes the positive, negative and ground wires. The positive lines are coupled together within the combining housing forming a first junction. The negative wires are coupled together within the combining housing forming a second junction. The ground wires are coupled together within the housing forming a third junction.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken through line 3-3 of FIG. 1.

FIG. 4 is a cross sectional view taken through line 4-4 of FIG. 2.

The same reference numerals refer to the same parts throughout the various Figures.

DESCRIPTION OF THE PREFERRED EMBODIMENT

Figure 1:
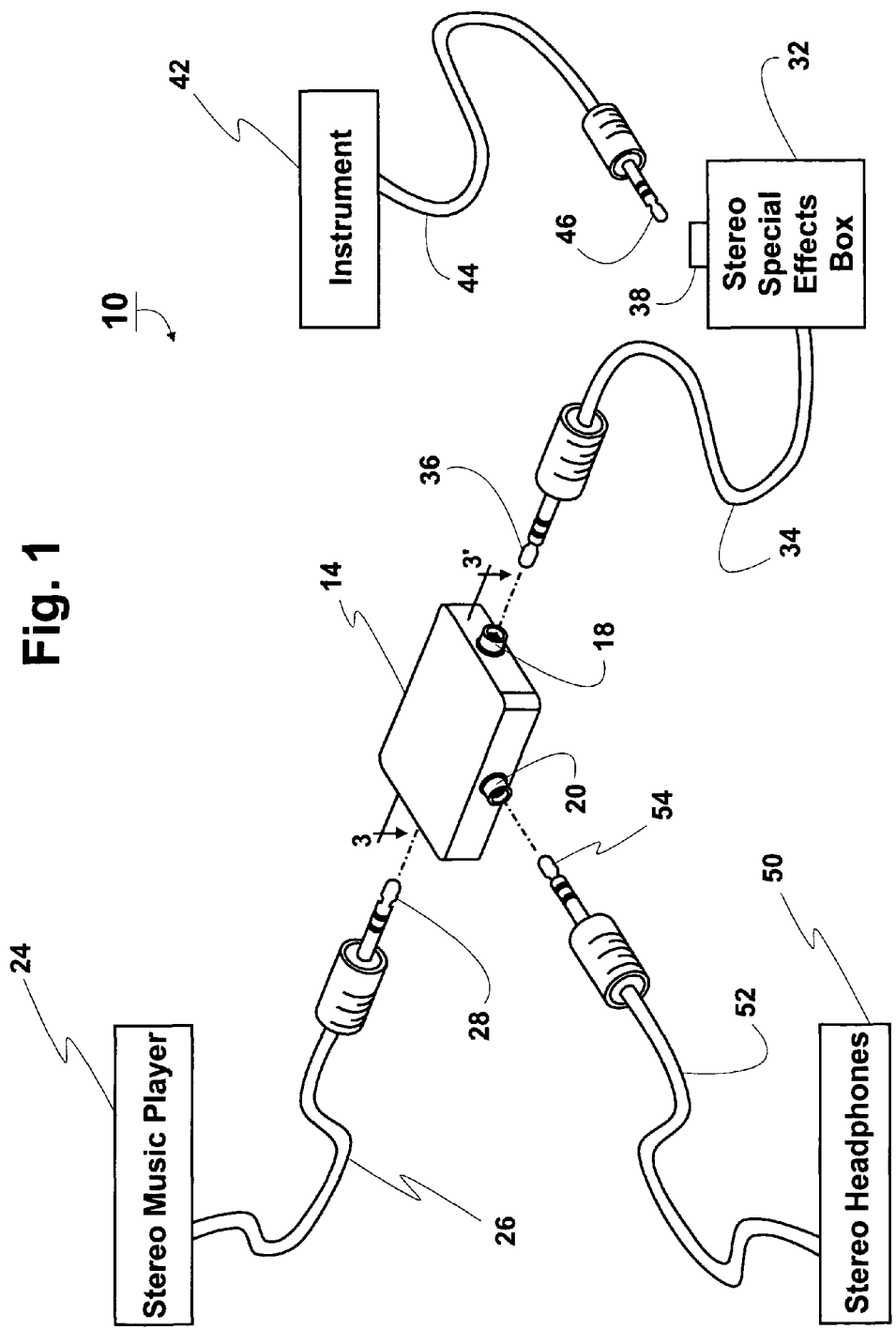
FIG. 1 is a perspective illustration of a musical instrument practice system constructed in accordance with the principles of the present invention.

With reference now to the drawings, and in particular to FIG. 1 thereof, the preferred embodiment of the new and improved musical instrument system embodying the principles and concepts of the present invention and generally designated by the reference numeral 10 will be described.

The present invention, the musical instrument system 10 is comprised of a plurality of components. Such components in their broadest context include a combining housing, a music player, a special effects box, earphones, a musical instrument, and an electrical assembly. Such components are individually configured and correlated with respect to each other so as to attain the desired objective.

The musical instrument practice system 10 of the present invention allows a learner to practice a musical instrument while concurrently listening to background music and to practice music while using earphones. The music is not heard by third persons. The practicing and listening is done in a convenient, reliable and economical manner. First provided is a combining housing 14. The combining housing has a plurality of female ports. The female ports include a first port 16 and a second port 18 each adapted to receive musical input. The female ports also include a third port 20 adapted to generate musical output as a function of the received inputs.

Next provided is a music player 24. The music players is chosen from the class of music players including an iPod, MP3 player, CD player, cassette player, and record player. A first electrical line 26 is provided. The first electrical line extends from the music player and terminates in a first free end. A first jack 28 is attached to the first free end. The first jack is adapted to be coupled to the first port whereby the music player will generate background music to the combining housing for being heard only by the learner.

Next, a special effects box 32 and a second electrical line 34 are provided. The second electrical line extends from the special effects box and terminates in a second free end. A second jack 36 is attached to the second free end. The second jack is adapted to be coupled to the second port. The special effects box has a supplemental port 38.

A musical instrument 42 is next provided and a supplemental electrical line 44 are provided. The supplemental electrical line extends from the musical instrument and terminates in a supplemental free end. A supplemental jack 46 is attached to the supplemental free end. The supplemental jack is adapted to be coupled to the supplemental port. In this manner, the musical instrument will generate player music to the combining housing for being heard only by the learner.

Next, earphones 50 and a third electrical line 52 are provided. The third electrical line extends from the earphones and terminating in a third free end. A third jack 54 is attached to the third free end. The third jack is adapted to be coupled to the third port. In this manner, the learner may use the earphones to listen to a combined output of the music player and the musical instrument for being heard only by the learner.

An electrical assembly is provided within the combining housing. Each of the electrical lines includes a positive wire 58 and a negative wire 60 and a ground wire 62. The electrical assembly includes the positive wires of each of the lines coupled together and forming a first junction 64, the negative wires of each of the lines coupled together and forming a second junction 66, and the ground wires of each of the lines coupled together and forming a third junction 68. The electrical assembly further includes a first resistor 70 in the positive wire of the first line adjacent to the first junction, a second resistor 72 in the negative wire of the first line adjacent to the second junction, and a third resistor 74 in the ground wire of the first line adjacent to the third junction.

Figure 2:
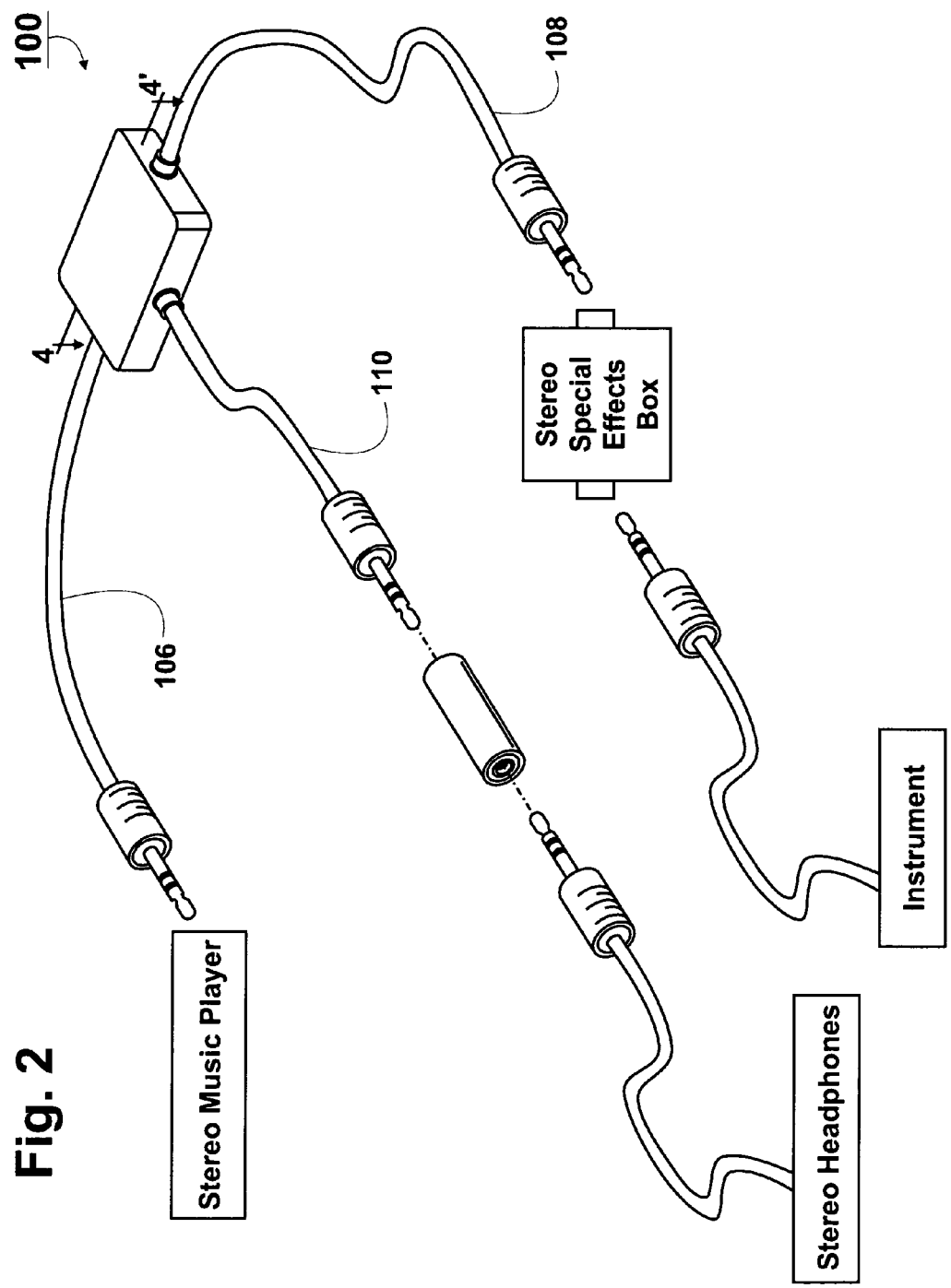
FIG. 2 is a perspective illustration of a musical instrument practice system constructed in accordance with an alternate embodiment of the invention.

Reference is now made to the alternate embodiment of the invention as illustrated in FIGS. 2 and 4. In this embodiment of the musical instrument practice system 100, the connectors are electrical lines 106, 108, 110. The electrical lines extend from the combining box and are adapted to be coupled to the music player, special effects box and earphones.

The present invention allows a learner to listen and learn from his/her favorite musicians playing on CD, MP3, iPod, etc. while the learner simultaneously plays his/her musical instrument, i.e., an electric guitar, drums, keyboard, through the musical instrument special effects device without being heard by others. A great way to produce a learner's musical talents along with a learner's musical heroes without disturbing others around the learner.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A musical instrument practice system (10) for allowing a learner to practice a musical instrument while concurrently listening to background music and practicing music while using earphones, the music not being heard by third persons, the system comprising, in combination:

a combining housing (14) having a plurality of female ports including a first port (16) and a second port (18) each adapted to receive musical input, and a third port (20) adapted to generate musical output as a function of the received inputs;

a music player (24) chosen from the class of music players including an iPod, MP3 player, CD player, cassette player, and record player, a first electrical line (26) extending from the music player and terminating in a first free end, a first jack (28) attached to the first free end, the first jack adapted to be coupled to the first port whereby the music player will generate background music to the combining housing for being heard only by a learner;

a special effects box (32), a second electrical line (34) extending from the special effects box and terminating in a second free end, a second jack (36) attached to the second free end, the second jack adapted to be coupled to the second port, the special effects box having a supplemental port (38);

a musical instrument (42), a supplemental electrical line (44) extending from the musical instrument and terminating in a supplemental free end, a supplemental jack 46 attached to the supplemental free end, the supplemental jack adapted to be coupled to the supplemental port whereby the musical instrument will generate player music to the combining housing for being heard only by the learner;

earphones (50), a third electrical line (52) extending from the earphones terminating in a third free end, a third jack (54) attached to the third free end, the third jack adapted to be coupled to the third port whereby the learner may use the earphones to listen to a combined output of the music player and the musical instrument for being heard only by the learner; and each of the electrical lines including a positive wire (58) and a negative wire (60) and a ground wire (62), an electrical assembly within the combining housing, the electrical assembly including the positive wires of each of the lines coupled together and forming a first junction (64), the electrical assembly including the negative wires of each of the lines coupled together and forming a second junction (66), the electrical assembly including the ground wires of each of the lines coupled together and forming a third junction (68), the electrical assembly including a first line defined as the line from the second port to first through third junctions and further including a first resistor (70) in the positive wire of the first line adjacent to the first junction, a second resistor (72) in the negative wire of the first line adjacent to the second junction, and a third resistor (74) in the ground wire of the first line adjacent to the third junction.

\* \* \* \* \*